United States Patent [19]
Schindel

[11] Patent Number: 4,461,051
[45] Date of Patent: Jul. 24, 1984

[54] APPARATUS FOR CLEANING STATOR WINDINGS

[75] Inventor: Arnold Schindel, Fairlawn, N.J.

[73] Assignee: The Singer Company, Little Falls, N.J.

[21] Appl. No.: 413,923

[22] Filed: Sep. 1, 1982

[51] Int. Cl.³ .............................................. A46B 13/04
[52] U.S. Cl. ................................... 15/21 E; 15/21 R; 15/56; 15/88; 15/104.1 R; 15/104.2
[58] Field of Search .................. 15/21 R, 21 E, 22 R, 15/24, 50 A, 56–58, 68, 75, 104.16, 104.2, 104.05, 104.1 R, 104.1 C, 88; 134/8

[56] References Cited

U.S. PATENT DOCUMENTS 1,529,691 3/1925 Davis .................................. 15/24 X
1,704,364 3/1929 Markley .................................. 15/88
2,911,665 11/1959 Mackiewicz et al. ................... 15/56
2,942,284 6/1960 Luker ....................................... 15/56
3,824,646 7/1974 Jai .................................. 15/104.1 R
3,996,637 12/1976 Shibata et al. .......................... 15/56

Primary Examiner—Edward L. Roberts
Attorney, Agent, or Firm—Thomas W. Kennedy; Morris Liss

[57] ABSTRACT

During assembly of a motor, a stator winding is installed in a jig in preparation of cleaning. A brush is moved axially through the central space of the winding. The shaft of the brush is equipped with fluid jets which direct solvent against the winding as it is being brushed. Dislodging of foreign matter from the winding is enhanced by pumping the solvent through the brush shaft in a pulsating manner.

6 Claims, 1 Drawing Figure

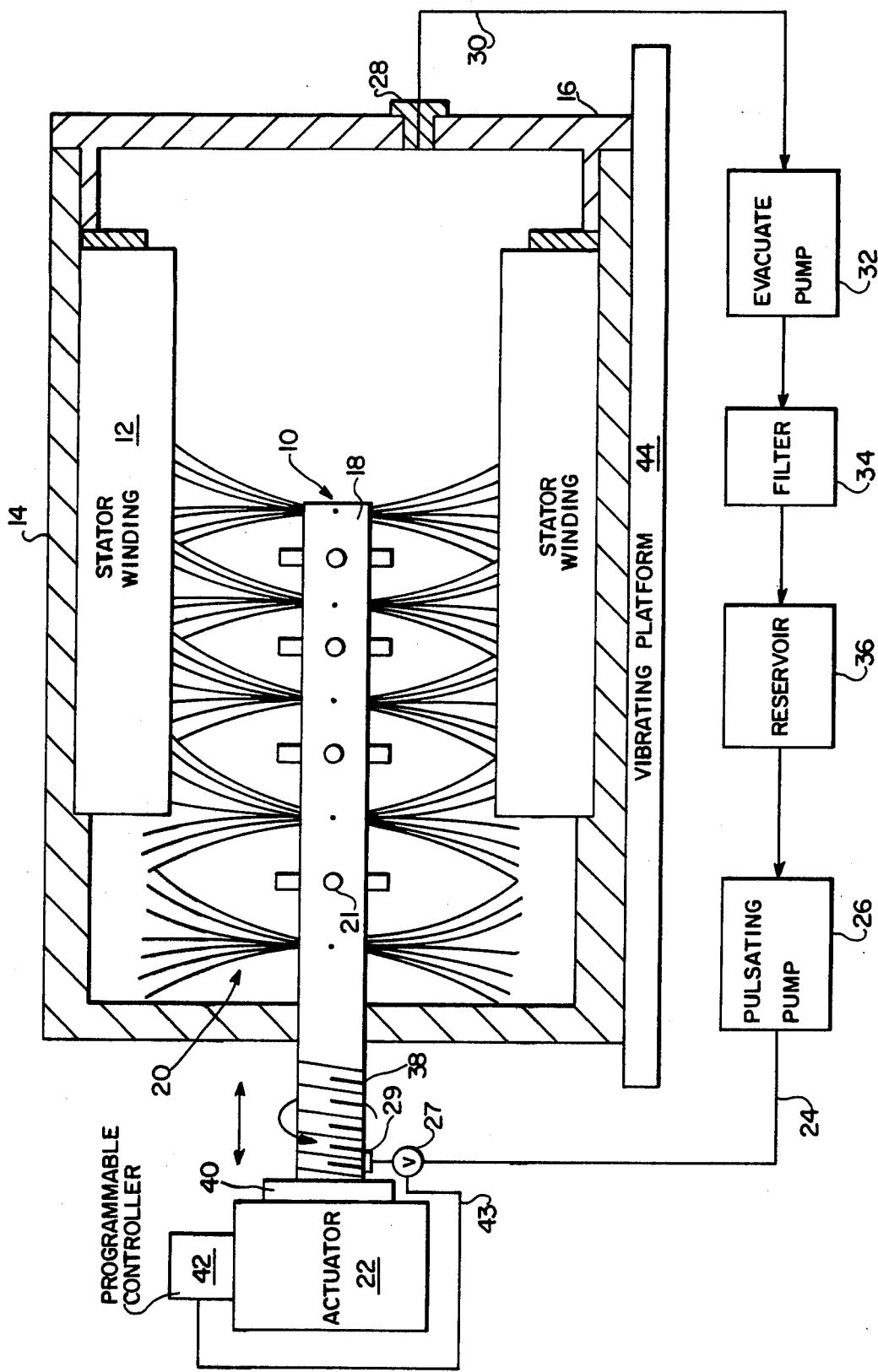

APPARATUS FOR CLEANING STATOR WINDINGS

FIELD OF THE INVENTION

The present invention generally relates to an automatic brush-equipped washing apparatus and more particularly to such an apparatus and corresponding method for cleaning stator windings.

BRIEF DESCRIPTION OF THE PRIOR ART

A wide variety of present-day electromagnetic devices, such as sensors and motors, are immersed and must remain operative in fluid. One example of this environment is in an aircraft fuel control system. Immersed devices for this type of system must operate extremely precisely. Accordingly, it is extremely important for dirt contamination of these devices to be controlled. Conventional cleaning operations have failed to offer a satisfactory solution for cleaning these devices which become contaminated by dirt present during device assembly.

A secondary contributor to this contamination is conventional cleaning operations themselves. One example is a manual cleaning operation whereby stator windings are washed utilizing a spray wand. It has been found that operator efficiency for such a cleaning operation lessens with repetitive processing late in the day thus resulting in a number of stators which are not thoroughly clean.

BRIEF DESCRIPTION OF THE PRESENT INVENTION

It is the primary purpose of the present invention to offer a method and structure to more effectively remove contamination, especially of debris-trapping spaces as may exist in non-smooth sensors or wire-wound forms of electrical equipment. Further, the present invention is directed to such a device and method for automatically mechanizing a closed loop adjustable system for optimizing the cleansing operation thereby providing uniformity of results.

In the case of a stator winding, this is achieved by passing a brush through the interior of the winding while pulsating fluid, emitted from jets in the brush shaft, spray the stator winding. The combination of brushing and pulsating fluid washing offers superior results when compared to the prior art. The brush shaft may move axially to and fro, within the stator winding or, in the event the stator winding includes skewed stacks, a rotational oscillation may be imparted to the brush as it moves through the stator winding.

Although the present invention is described in terms of cleaning a stator winding during assembly, it is applicable after an assembled motor exhibits a need for cleaning maintenance. The inventive device and method may also be extended to other types of devices where contamination must be dislodged from an interior space. The present invention provides a flexible (variable), uniform and effective cleaning system by comprising an automatic cleaning function which relieves the user from high labor costs and non-uniformity of results.

The above-mentioned objects and advantages of the present invention will be more clearly understood when considered in conjunction with the accompanying drawing, in which:

BRIEF DESCRIPTION OF THE FIGURE

The FIGURE is an illustration of the present brush device in a cleaning position within a stator winding.

DETAILED DESCRIPTION OF THE INVENTION

A brush-like cleaning device is generally indicated by reference numeral 10 and is illustrated in a cleaning position within the interior space of a stator winding 12. The stator winding 12 is shown prior to final assembly of a motor and appropriately contained in fixture 14. A cover plate 16 closes one end of fixture 14 and is easily removable so that stator windings may be quickly installed within fixture 14 for cleaning. The device 10 is seen to include a hollowed shaft 18 which mount brush bristles 20. These bristles are arranged in much the same manner as a round bottle brush. The length of the bristles are designed to achieve good brushing action against the surface of the stator winding. In between the brush bristles 20 are fluid jet nozzles 21 that extend radially outwardly from shaft 18 from which solvent is sprayed for impingement upon the stator winding.

In order to deliver solvent to nozzles 21, a pulsating pump 26 is provided. This pump may be of the type commercially used in the WATER PIC dental hygiene device. The outlet from pump 26 has pipe 24 connected thereto for delivering pulsating fluid to an electromagnetically controllable valve 27. The outlet from the valve is connected, via a flexible hose, to a coupling 29 which introduces the pulsating fluid to the interior of the hollow shaft 18. Cover 16 is provided with an outlet port 28 through which the solvent, with removed contamination, may be removed. This is accomplished by an evacuation pump 32 that is connected to the outlet port 28 by pipe 30. The contamination fluid then undergoes filtering (34) so that it may be recycled to reservoir 36. The recycled solvent is now in proper condition for introduction to the pulsating pump 26.

A conventional actuator 22 may be used to provide the hollow shaft 18 with axial motion. The actuator may be electrical, hydraulic or pneumatic. In a preferred embodiment of the invention, in order to reduce extraneous contamination effects and to provide for maximum flexibility of changing operational parameters, a pneumatic version would be used.

A programmable controller 42 automatically operates the actuator 22 as well as electromagnetically controlled valve 27. Such a controller typically includes a microprocessor for permitting selection of stroke, frequency of reversal and speed of cycling. This type of controller is quite conventional in its use with numerical controlled tool devices and its specific design is not part of the present invention, per se.

In its simplest form of operation, shaft 18 undergoes axial displacement to the left and the right as indicated in the FIGURE. Displacement of the hollowed shaft 18 accomplishes brushing or scrubbing of the stator winding 12 while pulsating jets of solvent impinge upon the stator winding. The combination of the brushing and pulsating jet impingement accomplishes removal of contaminating debris of the stator winding which is then removed by pump 32 and recycled.

In the event the stator winding includes skewed stacks, shaft 18 may have threads 38 formed therealong which are received within a threaded member 40 mounted to actuator 22. Actuator 22 then imparts a rotational motion to shaft 18 as well as an axial motion.

The result is enhanced removal of contaminating debris from the skewed surfaces and associated open spaces at the windings.

An additional feature of the invention is the location of fixture 14 on a vibrating platform 44 so that additional loosening action is imparted to the contaminating debris in the stator winding.

Although the description thus far has been directed to the use of solvent liquids, the invention is generally applicable to the use of fluid jets including compressed gas.

It is to be stressed that although the present invention has been described in terms of cleaning a stator winding, it is applicable to cleaning the interior of other devices where the removal of contaminating debris is a problem.

As will be appreciated, in addition to providing a more flexible (variable) and more uniform cleaning system, the operation of the present invention offers automatic cleaning relieving a user from the high cost of labor that is necessary with the prior art manual cleaning techniques. The overall result is superior cleaning automatically with consistent results.

It should be understood that the invention is not limited to the exact details of construction shown and described herein for obvious modifications will occur to persons skilled in the art.

I claim:

1. A cleaning system comprising:
   a hollow shaft;
   brush means mounted to the shaft for contacting an object to be cleaned;
   nozzle means located along the length of the shaft;
   means for delivering fluid to the shaft for creating fluid jets from the nozzle means which impinge against the object to be cleaned; and
   actuating means for automatically moving the shaft in a linear reciprocating motion simultaneous with the occurrence of the impinging jets, wherein the fluid delivering means includes a pump for generating pulsations in the fluid resulting in pulsating jets.

2. The structure set forth in claim 1 together with means coupling the shaft and the actuating means for imparting rotation to the shaft simultaneous with linear shaft motion.

3. The structure of claim 2 together with fluid tight enclosure means for supporting the object.

4. The structure of claim 3 together with a pump connected to the enclosure means for evacuating contaminated cleaning fluid therefrom.

5. The structure of claim 4 together with means connected to the evacuating pump for filtering the contaminated fluid to permit the recycling thereof.

6. The structure of claim 5 together with means for vibrating the enclosure means to enhance dislodging of contamination from the object.

* * * * *